US008996467B2

(12) United States Patent
Apte et al.

(10) Patent No.: US 8,996,467 B2
(45) Date of Patent: Mar. 31, 2015

(54) DISTRIBUTED SCALABLE DEDUPLICATED DATA BACKUP SYSTEM

(75) Inventors: Anand Apte, Pune (IN); Faisal Puthuparackat, Pune (IN); Jaspreet Singh, Santa Clara, CA (US); Milind Borate, Pune (IN); Shekhar S. Deshkar, Pune (IN)

(73) Assignee: Druva Inc., Sunnyvale, CA (US)

( * ) Notice: Subject to any disclaimer, the term of this patent is extended or adjusted under 35 U.S.C. 154(b) by 343 days.

(21) Appl. No.: 13/340,441

(22) Filed: Dec. 29, 2011

(65) Prior Publication Data

US 2013/0173553 A1   Jul. 4, 2013

(51) Int. Cl.
*G06F 17/30* (2006.01)
*G06F 7/00* (2006.01)

(52) U.S. Cl.
CPC . *G06F 7/00* (2013.01); *G06F 17/30* (2013.01)
USPC ............................ 707/640; 707/692; 707/741

(58) Field of Classification Search
USPC .......... 707/640, 692, 741; 711/118, 156, 695, 711/822
See application file for complete search history.

(56) References Cited

U.S. PATENT DOCUMENTS

| 7,631,155 | B1 | 12/2009 | Bono et al. |
| 7,672,981 | B1 | 3/2010 | Faibish et al. |
| 7,694,191 | B1 | 4/2010 | Bono et al. |
| 7,818,535 | B1 | 10/2010 | Bono et al. |
| 7,925,683 | B2 | 4/2011 | Jain et al. |
| 8,037,345 | B1 | 10/2011 | Iyer et al. |
| 8,041,735 | B1 * | 10/2011 | Lacapra et al. ............... 707/783 |
| 8,285,758 | B1 | 10/2012 | Bono et al. |
| 8,452,739 | B2 | 5/2013 | Jain et al. |
| 8,566,371 | B1 | 10/2013 | Bono et al. |
| 8,849,767 | B1 * | 9/2014 | Zheng et al. ................... 707/664 |
| 2003/0225469 | A1 * | 12/2003 | DeRemer et al. ............... 700/96 |
| 2005/0203940 | A1 | 9/2005 | Farrar et al. |
| 2005/0210049 | A1 | 9/2005 | Foster |
| 2008/0005141 | A1 | 1/2008 | Zheng et al. |
| 2008/0120129 | A1 | 5/2008 | Seubert et al. |
| 2009/0307184 | A1 | 12/2009 | Inouye et al. |
| 2010/0153617 | A1 * | 6/2010 | Miroshnichenko et al. ...... 711/6 |
| 2010/0161685 | A1 | 6/2010 | Jain et al. |
| 2010/0274772 | A1 * | 10/2010 | Samuels ........................ 707/693 |
| 2010/0306412 | A1 * | 12/2010 | Therrien et al. ............. 709/247 |
| 2011/0082841 | A1 * | 4/2011 | Christiaens et al. .......... 707/692 |
| 2012/0005171 | A1 | 1/2012 | Anglin et al. |
| 2012/0059800 | A1 * | 3/2012 | Guo .............................. 707/664 |
| 2012/0095971 | A1 * | 4/2012 | Shyam et al. ................. 707/690 |
| 2012/0096008 | A1 | 4/2012 | Inouye et al. |
| 2012/0117035 | A1 * | 5/2012 | Ranade et al. ................ 707/690 |
| 2012/0158670 | A1 * | 6/2012 | Sharma et al. ............... 707/692 |
| 2012/0185447 | A1 * | 7/2012 | Zhang et al. ................. 707/693 |
| 2012/0330903 | A1 * | 12/2012 | Periyagaram et al. ........ 707/692 |
| 2013/0086006 | A1 | 4/2013 | Colgrove et al. |
| 2013/0097380 | A1 | 4/2013 | Colgrove et al. |

* cited by examiner

*Primary Examiner* — Hanh Thai

(74) *Attorney, Agent, or Firm* — Fenwick & West LLP

(57) ABSTRACT

A distributed, cloud-based storage system provides a reliable, deduplicated, scalable and high performance backup service to heterogeneous clients that connect to it via a communications network. The distributed cloud-based storage system guarantees consistent and reliable data storage while using structured storage that lacks ACID compliance. Consistency and reliability are guaranteed using a system that includes: 1) back references from shared objects to referring objects, 2) safe orders of operation for object deletion and creation, 3) and simultaneous access to shared resources through sub-resources.

18 Claims, 11 Drawing Sheets

DISTRIBUTED SCALABLE DEDUPLICATED DATA BACKUP SYSTEM

BACKGROUND

This disclosure relates generally to data storage systems and, in particular, to cloud-based scalable storage systems used for data backup by heterogeneous clients in a network.

As computers, smart phones, tablets, laptops, servers, and other electronic devices increase in performance year to year, the data they generate also increases. Individuals and enterprises have in the past managed their own data backup systems but as the volumes of data grow, it has become impractical for many individuals and organizations to manage their own backup systems.

However, commercial providers of data backup services face many challenges related to the management of vast quantities of data from multiple clients. When data volumes grow into the range of hundreds of terabytes or even petabytes, many conventional data management techniques fail to scale economically and efficiently. Being able to service hundreds or even thousands of simultaneous data requests from remote clients may also be a challenge for many off the shelf database systems such as MYSQL or SQL SERVER.

While there are other structured storage systems that offer much better scalability and provide for parallel access by hundreds of clients, these structured storage systems do not usually provide the transactional reliability—i.e. atomicity, consistency, isolation, and durability (ACID compliance)—provided by traditional relational database systems. Without ACID compliance the reliability and internal consistency of customer data is difficult to guarantee, especially when data volumes and client numbers soar. This problem is made more severe when the storage systems attempt to deduplicate client data. Deduplication allows duplicate data (including both files and sub-file structures) to be stored only once, but to be accessed by multiple clients. Deduplication can reduce the storage requirements for an enterprise or individual significantly. However, deduplication results in multiple references to stored data. When multiple clients have references to the same data, and clients are able to access the data concurrently, the lack of atomicity and isolation in database transactions can lead to fatal consistency problems and data loss. Using conventional parallel processing techniques such as access locks on shared data is impractical when client numbers grow into the hundreds because such locks stall concurrent access and degrade client performance to an unacceptable degree.

DETAILED DESCRIPTION

The figures depict various example embodiments of the present invention for purposes of illustration only. One skilled in the art will readily recognize from the following discussion that alternative embodiments of the structures and methods illustrated herein may be employed without departing from the principles described herein.

A distributed, cloud-based storage system provides a reliable, deduplicated, scalable and high performance backup service to heterogeneous clients that connect to it via a communications network.

The distributed cloud-based storage system guarantees consistent and reliable data storage while using structured storage that lacks ACID compliance. Consistency and reliability are guaranteed using a system that includes: 1) back references from shared objects to referring objects, 2) safe orders of operation for object deletion and creation, 3) and simultaneous access to shared resources through sub-resources.

System Overview

Figure 1:
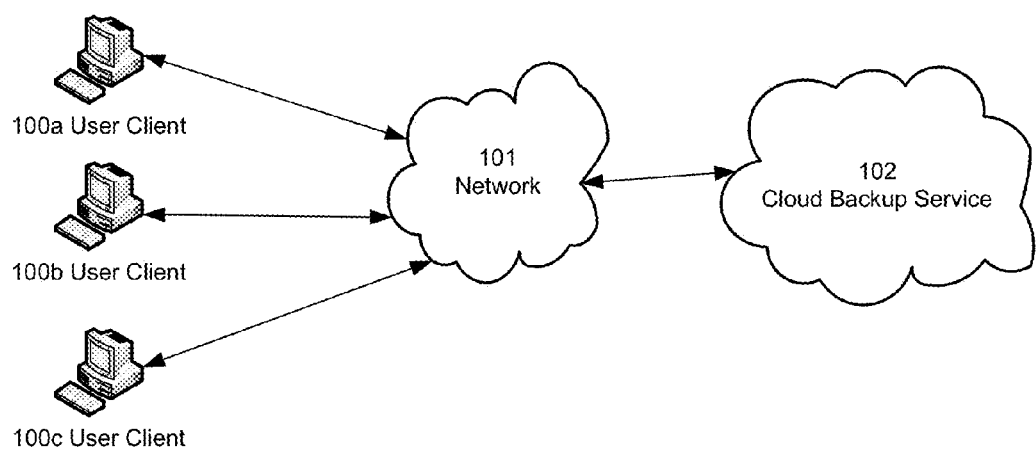
FIG. 1 is a diagram of a cloud backup service providing data storage services over a network to distributed clients, according to one example embodiment.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

FIG. 1 illustrates one embodiment of a cloud backup service 102 providing data backup services to user clients 100 over a network 101.

The user client 100 can be any computing device that has data that requires backup. Examples of such a device include a personal computer (PC), a desktop computer, a laptop computer, a notebook, and a tablet PC. Examples also include a device executing an operating system, for example, a Microsoft Windows-compatible operating system (OS), Apple OS X, and/or a Linux distribution. The user client 100 can also be any device having computer functionality, such as a personal digital assistant (PDA), a mobile telephone, a smartphone, a device executing the iOS operating system, the Android operating system, Windows Mobile operating system, or WebOS operating system. The user client 100 may also be a server device that requires backup, such as a web server (running for example APACHE), a file server, a database server, etc. Although such server devices may perform server functions in an organization, from the point of view of the cloud backup service 102 they are treated like any other client device that requires data backup services.

The cloud backup service 102 enables the user client 100 to upload data for backup, and to download data that has been backed up in the past. The cloud backup service 102 has the capability to deduplicate data such that a user client 100 will not need to upload data to the cloud backup service 102 if the same data has been uploaded in the past.

The interactions between the user client 100 and the cloud backup service 102 are typically performed via a network 101, for example, via the internet. The network 101 enables communications between the user client 100 and the cloud backup service 102. In one embodiment, the network 101 uses standard communications technologies and/or protocols. Thus, the network 101 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 101 can also include links to other networks such as the Internet.

Example System Details

Figure 2:
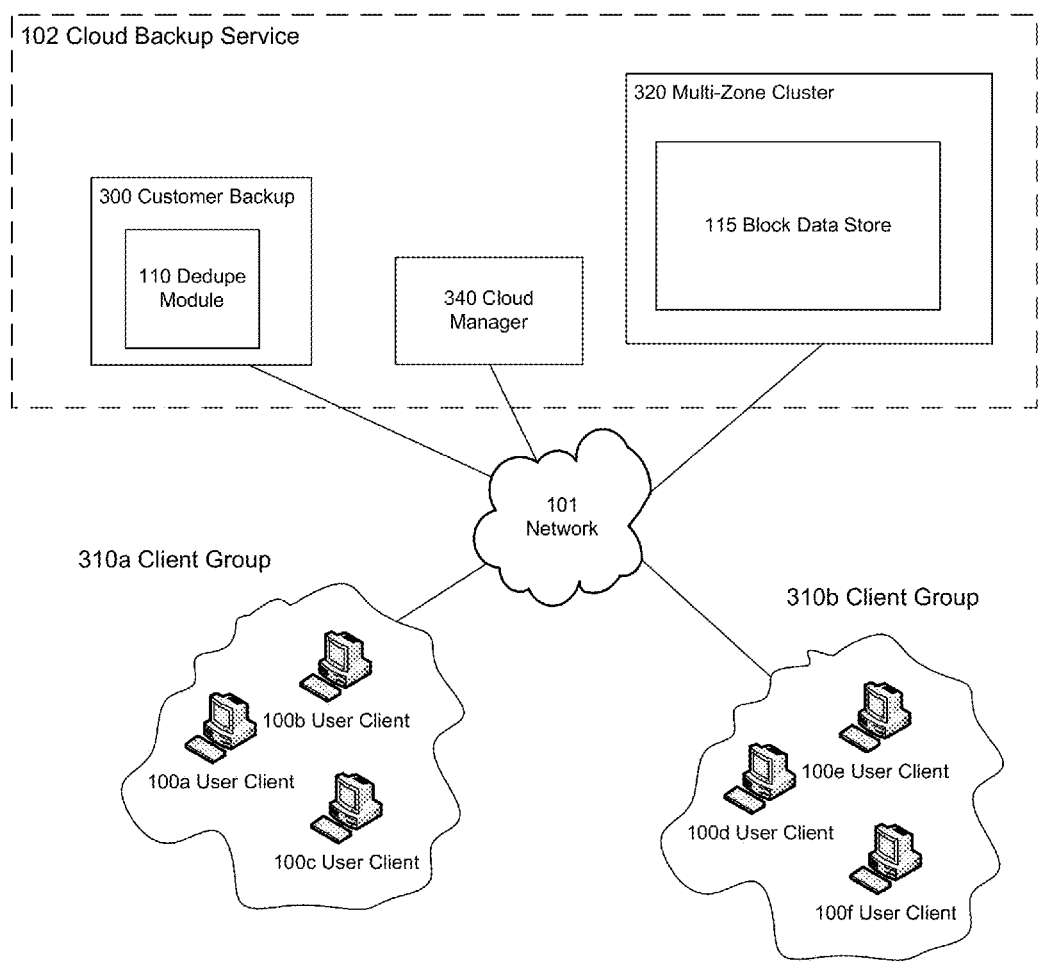
FIG. 2 is a diagram of a system for providing cloud-based backup services to clients that are distributed in client groups over a network, according to one example embodiment.

FIG. 2 illustrates one embodiment of a system for providing backup up services to clients that are distributed in client groups across a network. The cloud backup service 102 is a distributed network service that can provide remote backup services to large numbers of clients over a network 101. The cloud backup service 102 is composed of several conceptually distinct components including the customer backups 300 and the multi-zone cluster 320. Although these components are conceptually separate, in practice they may overlap in terms of both their software implementation as well as their hardware execution environment. The multi-zone cluster 320 provides storage for the raw data uploaded by clients that is stored by the cloud backup service 102. The raw data uploaded by clients can include any data that clients may want to backup including files, disk images, emails, virtual machine images, etc. The raw data is stored in the block data store 115. The multi-zone cluster may be implemented in a distributed manner. In one embodiment, the multi-zone cluster is implemented as a service running on a cloud storage platform such as AMAZON SIMPLE STORAGE SERVICE (AMAZON S3). In another embodiment, the multi-zone cluster is implemented using one or more computer servers running a distributed structured storage system such as HADOOP FILE SYSTEM.

The customer backup 300 provides services that help clients to efficiently manage and secure their data in the cloud backup service 102. The customer backup provides bookkeeping and deduplication services. Deduplication is the process by which the cloud backup service 102 detects duplicate data—either before upload to the multi-zone cluster 320 or after upload—and creates references from multiple referrers to a single stored instance of the data. For example, if user client 100*a* stores data X in the cloud backup service 102, and subsequently user client 100*b* attempts to store the same data X, customer backup 300 will detect the duplication and only one digital copy of data X will be uploaded to multi-zone cluster 320. Both user client 100*a* and user client 100*b* will have access to the same copy of data X in the multi-zone cluster 320. This deduplication promotes efficient usage of storage resources in the cloud backup service 102, and lowers costs for customers. Deduplication is facilitated by the dedupe module 110, and the process is described in more detail below.

The customer backup 300 provides services for clients that are separated into client groups 310. A client group may include clients corresponding to a single customer account, or they may be clients in a single sub-network or geographical area, or they may be clients that are unrelated but that are grouped for administrative reasons. Deduplication of data is performed only between clients of a single client group. Clients in different client groups may have duplicate data stored in the multi-zone cluster. For example, in FIG. 2, when user client 100*a* stores data X, deduplication done by customer backup 300 will prevent user client 100*b*, which is in the same client group 310*a*, from uploading the same data X to the multi-zone cluster 320. However, user client 100*d*, which is in client group 310*b*, will not be deduplicated with respect to data X stored by user client 100*a*. If user client 100*d* stores data X, a separate copy of data X will be uploaded to the multi-zone cluster 320.

The customer backup 300 may be implemented as a distributed service running on a cloud infrastructure. The customer backup 300 may spawn multiple processes (hundreds or even thousands of concurrent processes) to service the backup requests of many clients simultaneously. For example, the customer backup 300 may be implemented using multiple instances of a cloud service such as AMAZON ELASTIC COMPUTE CLOUD (EC2).

The cloud manager 340 manages system-wide administrative tasks required by cloud backup service 102. These administrative tasks include authentication of users, tracking of client resource usage, etc. All requests from a user client 100 for backup services are first received by the cloud manager 340. The cloud manager authenticates the user client 100 and then mediates a secure connection between the user client 100 and the customer backup 300.

Figure 3:
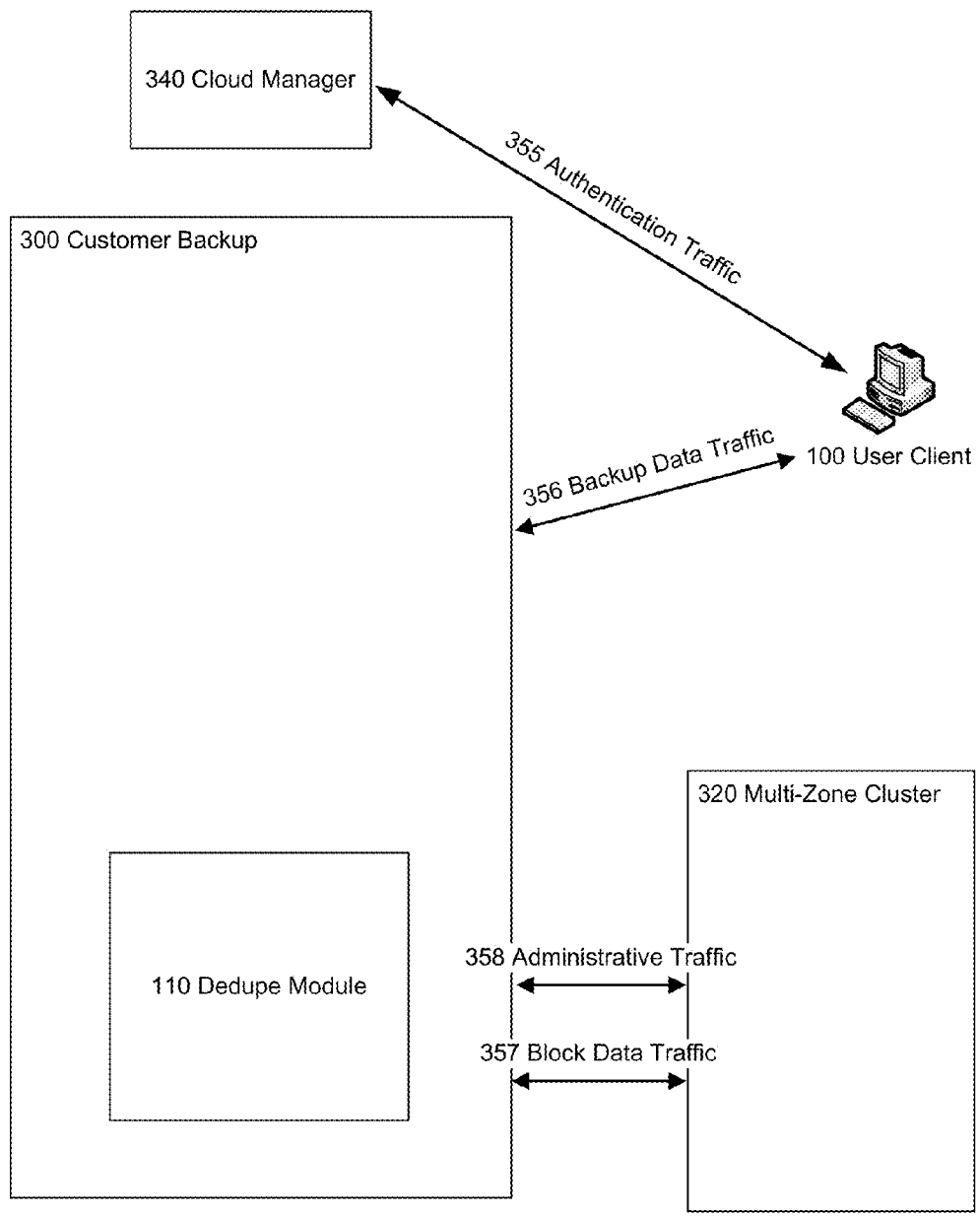
FIG. 3 is a diagram of a system architecture of a customer backup in a cloud backup system, and the data traffic communicated between a user client, customer backup modules, and a multi-zone cluster, according to one example embodiment.

FIG. 3 illustrates an embodiment of the customer backup 300 and shows the data traffic between the user client 100 and the modules of the cloud backup service 102. In this embodiment there are at least four types of data traffic between the user client 100 and the modules of the cloud backup service 102. The first type of data is the authentication traffic 355, which establishes the identity of the user client 100 and ensures that the user client has sufficient privileges to store, modify, delete or retrieve data from the customer backup 300. The authentication traffic 355 occurs between the user client 100 and the cloud manager 340, which has the capability to provide secure communications for authentication. Authentication of the user client 100 can be done through user name and password, biometric ID, hardware security key, or any other scheme that provides secure authentication over the network 101.

The second type of data traffic is the backup data traffic 356 that occurs between the user client 100 and the customer backup 300. The backup data traffic 356 primarily consists of the raw data communicated from the user client 100 to the cloud backup service 102. However, the backup data traffic 356 also includes checksums and other data required by the deduplication module, to provide the deduplication functionality. The checksums are digital signatures that are computed from the raw data that the user client 100 wishes to backup. A checksum is a hash computed from a block of raw data (such as a file block) that can be used to uniquely identify that block of raw data from other blocks of raw data. The backup data traffic may also include user requests (user commands) to read, modify, or delete data in the cloud backup service 102. The data in the backup data traffic 356 is typically compressed and encrypted for efficiency and security.

The third type of traffic is the block data traffic 357, which occurs between the customer backup 300 and the multi-zone cluster 320. The block data traffic 357 contains the raw data from backed up files that was communicated from the user client 100 to the cloud backup service 102. The data in the block data traffic 357 is also typically compressed and encrypted for efficiency and security. In one embodiment, the client 100, instead of sending block data to the customer backup 300, may directly communicate the block data to the multi-zone cluster 320, which removes the need for the block data traffic 357.

The fourth type of traffic is the administrative traffic 358, which occurs between the customer backup 300 and the multi-zone cluster 320. The administrative traffic 358 includes communication from the customer backup 300 to the multi-zone cluster 320 indicating block data that may need to be deleted or modified due to user client activity.

Figure 4:
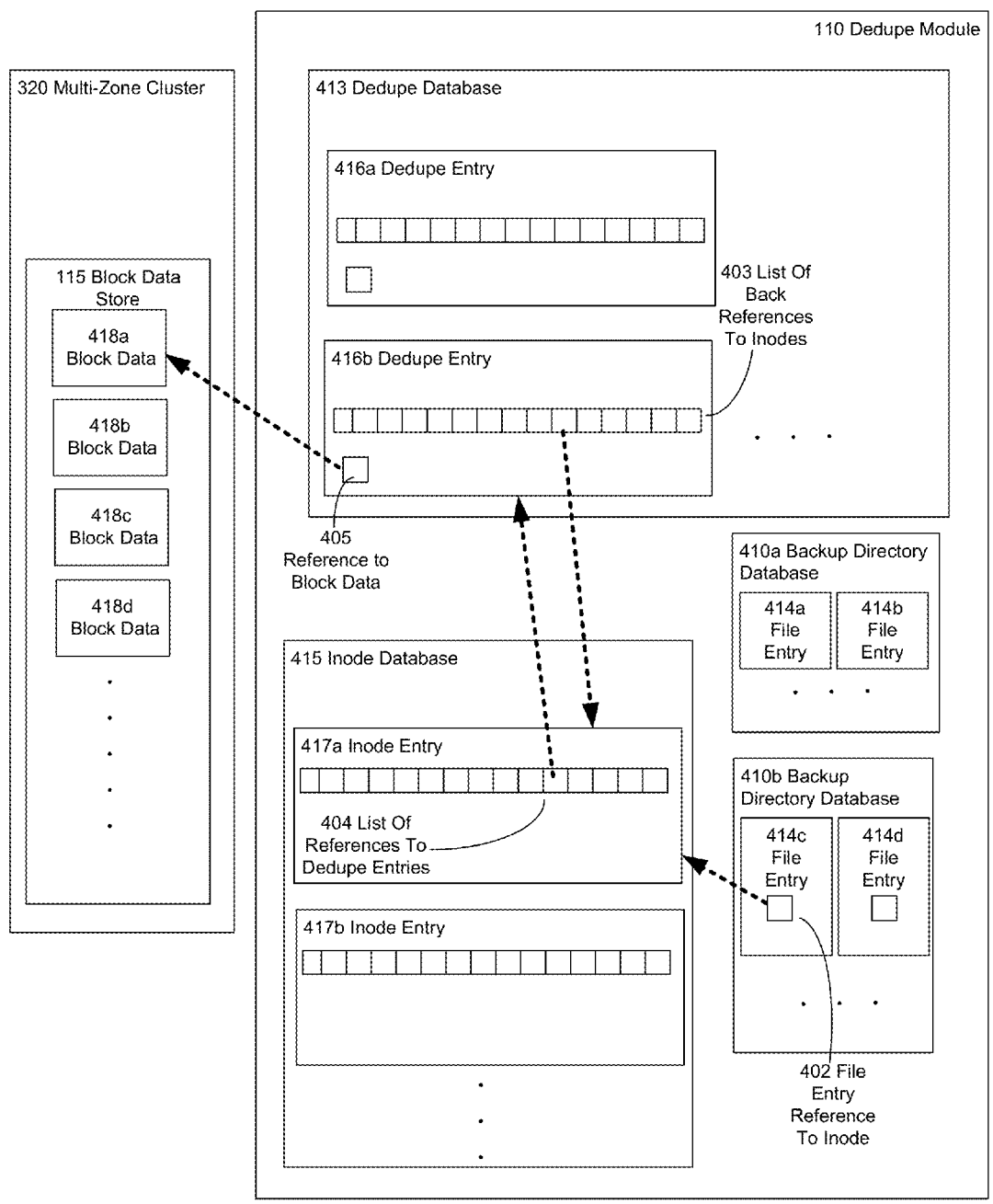
FIG. 4 illustrates the linkages between various data entries in the customer backup and the multi-zone cluster, according to one example embodiment.

FIG. 4 illustrates the structure and relationship between the data entities in the dedupe module 110 and the multi-zone cluster 320. The dedupe module 110 may include three conceptually distinct types of data stores: the backup directory databases 410, the inode database 415, and the dedupe database 413. These databases are implemented using a scalable distributed storage system that is fault tolerant and concurrently accessible (e.g. APACHE CASSANDRA running on AMAZON WEB SERVICES). A fourth conceptually distinct data store is contained in the multi-zone cluster: the block data store 115. Although these data stores are conceptually distinct, they may be implemented in a single logical database, in multiple databases, or in any other manner that would be known to one skilled in the database arts.

The backup directory databases 410 each contain the logical structure of the backed up directories of a single user client 100. There are multiple backup directory databases 410a, 410b, etc., one for each user client whose backup is managed by the customer backup 300. A backup directory database 410 contains file entries 414, which contain information about the files stored in a client's backup. The file entries 414 contain information such as file name, file version etc. The file entries 414 also contain a reference 402 to an inode entry 417.

The inode entries 417 are stored in an inode database 415. Each file entry 414 contains a reference to a single inode entry 417. Each inode entry 417 contains metadata pertaining to the file that refers to it. The metadata may include information such as file size, file name, etc., but it also contains a list of references 404 to one or more dedupe entries 416 and offsets for these entries.

The dedupe entries 416 store metadata pertaining to the raw data from the user client 100 stored in the cloud backup service 102. The dedupe entries 416 are stored in the dedupe database 413. Each dedupe entry 416 contains a reference 405 to block data 418 in the block data store 115, as well as a list of one or more back references 403 to the inode entries 417 that reference it. Each dedupe entry 416 also contains a checksum (hash) for the data that is stored in the corresponding block data 418.

The block data 418 is stored in the block data store 115. Each block data 418 contains raw data from a block of a file stored by a user client 100.

Data Retrieval

In order to retrieve a file previously stored on the cloud backup service 102, a user client 100 first authenticates itself with the customer backup 300. The authentication process is managed by the cloud manager 340, and authentication traffic 355 occurs between the user client 100 and the cloud manager 340. This authentication traffic 355 may include encrypted exchanges of keys and passwords, or any other security scheme known to those with familiarity in the data security arts.

After authentication, the user client 100 requests the file from customer backup 300. The customer backup 300 manages the process of locating the stored file. First the customer backup 300 locates the backup directory 410 related to that user client. Once the backup directory 410 is located, the customer backup 300 will identify the file entry 414 corresponding to the requested file. The file entry 414 contains the reference 402 to the inode entry 417, which in turn contains a list of references to dedupe entries 416 and corresponding offsets. The customer backup 300 retrieves the block data 418 locations from each dedupe entry 416 and using the offset information sends an ordered list of data blocks to the user client 100.

The user client 100 receives the ordered list of block data 418 from the block data store 115, and reconstructs the backed up file by appending this data in order.

Data Upload

Figure 5:
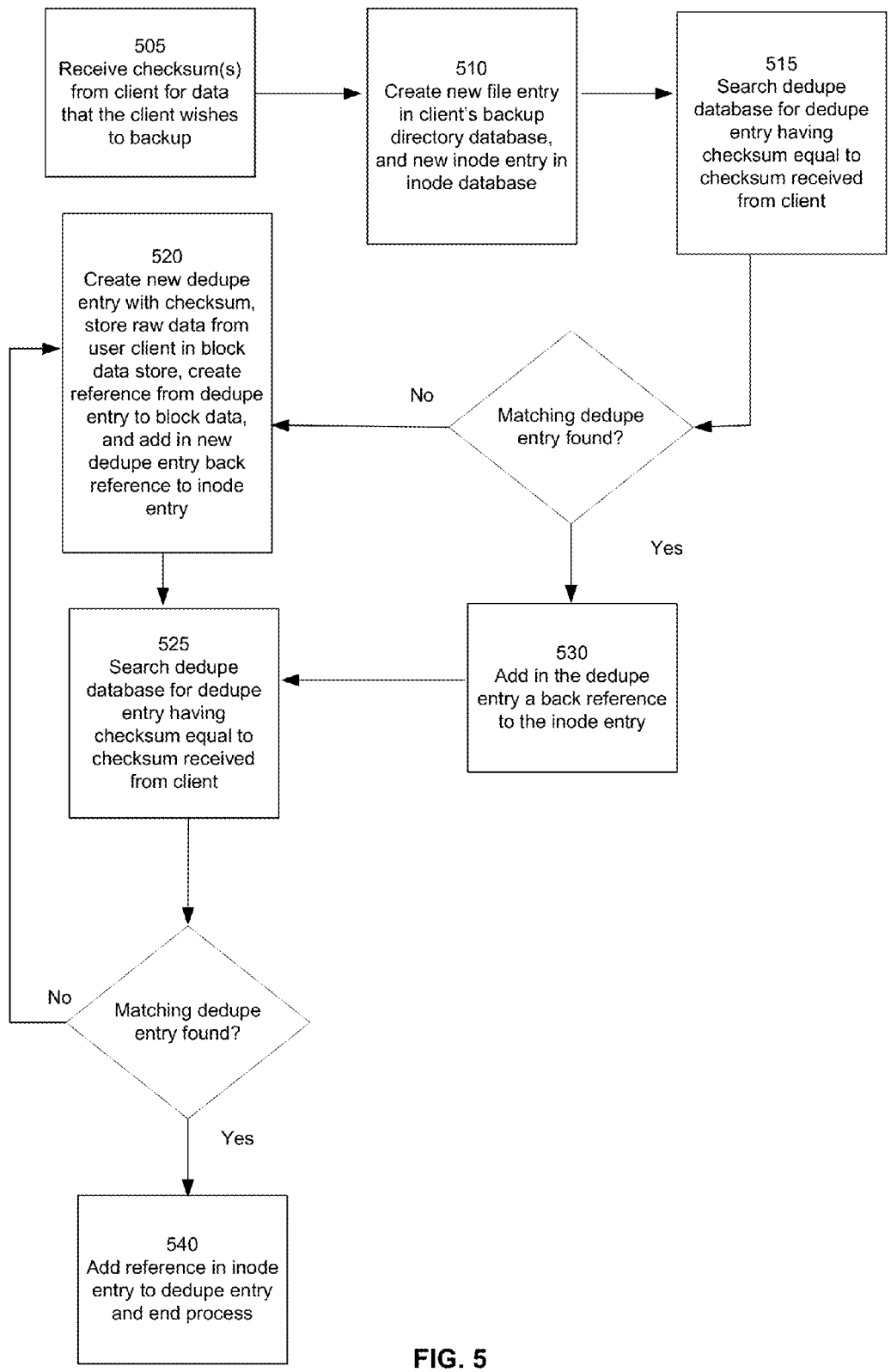
FIG. 5 illustrates one example embodiment of a process used by a cloud backup service to receive new data from a user client.

FIG. 5 illustrates one embodiment of a process used by the cloud backup service 102 to receive new data from a user client 100, for backup. After the cloud manager 340 has authenticated the user client 100, the customer backup 300 receives 505 a request to store data from the user client 100. The request will include one or more checksums computed from the data. The number of checksums will depend on how large the data is. A file that is very small may produce only a single checksum, while larger files may result in multiple checksums. The checksums are signatures that uniquely identify the data. Checksums may be computed from the data using hash functions such as, for example, SHA-1.

When the cloud backup service 102 receives a checksum with a request to store new data (e.g., data that is part of a file), the service may create 510 a new file entry 414 in the user client's backup directory database 410, if a file entry 414 does not already exist for that file in the backup directory database 410. If the user client 100 has not interacted with the cloud backup service 102 in the past, a backup directory database 410 may also need to be created for the client before the file entry 414 is created. Once the file entry 414 is created, an inode entry 417 is created for that file entry 414 (if one does not already exist) in the inode database 415. A reference is stored in the file entry 414 to the inode entry.

The dedupe database 413 contains a list of dedupe entries 416 that contain information—including checksums—for each piece of data uploaded to the customer backup 300 of the cloud backup service 102. The customer backup 300 searches 515 the dedupe database 413 for a dedupe entry 416 that has a checksum equal to the checksum received in the backup request from the user client 100. If a matching dedupe entry is found, it means that the same data has been uploaded to the cloud backup service 102 previously, and the same data need not be stored again. A back reference to the inode entry 417 is added to the list of back references 403 of the matching dedupe entry 416.

If no matching dedupe entry is found then a new dedupe entry is created 520 with a checksum equal to the checksum received from the user client 100. The raw data that the user client 100 wishes to backup is then received and is sent to the multi-zone cluster 320 where it is stored in the block data store 115. A reference to the block data 405 is stored in the new dedupe entry 416; the reference 405 identifies the block data 418 containing the stored raw data. A back reference to the inode entry 417 is added to the list of back references 403 of the new dedupe entry 416; this back reference is useful in garbage collection and in maintaining system consistency.

As yet no forward reference to the dedupe entry 416 has been added to the inode entry 417. Before this can be done the dedupe database 413 is again searched 525 for the dedupe entry having a checksum equal to the checksum received from the client. The purpose of this second search is to prevent storing a forward reference in the inode entry 417 in the situation where the dedupe entry 416 has been deleted after the adding of the back reference. Since the customer backup 300 is implemented in a distributed manner with continuously running garbage collection processes running in the background, it is important to make this check after adding the back reference to the dedupe entry 416 to insure that a garbage collection process has not purged the dedupe entry 416 between checks. Once the existence of the dedupe entry 416 with the matching checksum is confirmed again, a reference to the dedupe entry 416 is added 540 to the list of references 404 in the inode entry 417.

If the matching dedupe entry 416 is not found then the customer backup 300 will again create 520 a new dedupe entry 416 as described above and repeat the process.

Consistency Checking

The cloud backup service 102 is implemented in a distributed manner and receives and processes multiple user client requests simultaneously. As a result inconsistencies may develop in the system without proper maintenance processes in place. Since some data objects in the cloud backup service 102 have multiple referrers (e.g., dedupe entries that are referred to by multiple inode entries), there needs to be a garbage collection process that can iterate through the data objects and purge those data objects that are orphaned (i.e., are no longer referenced). Additionally, some data objects have references to multiple objects, and there is a need to make sure that those referred objects have reciprocal back references to the referring data objects (e.g., an inode entry may refer to multiple dedupe entries, and each of those dedupe entries must have a back reference to the inode entry to maintain consistency).

Figure 6A:
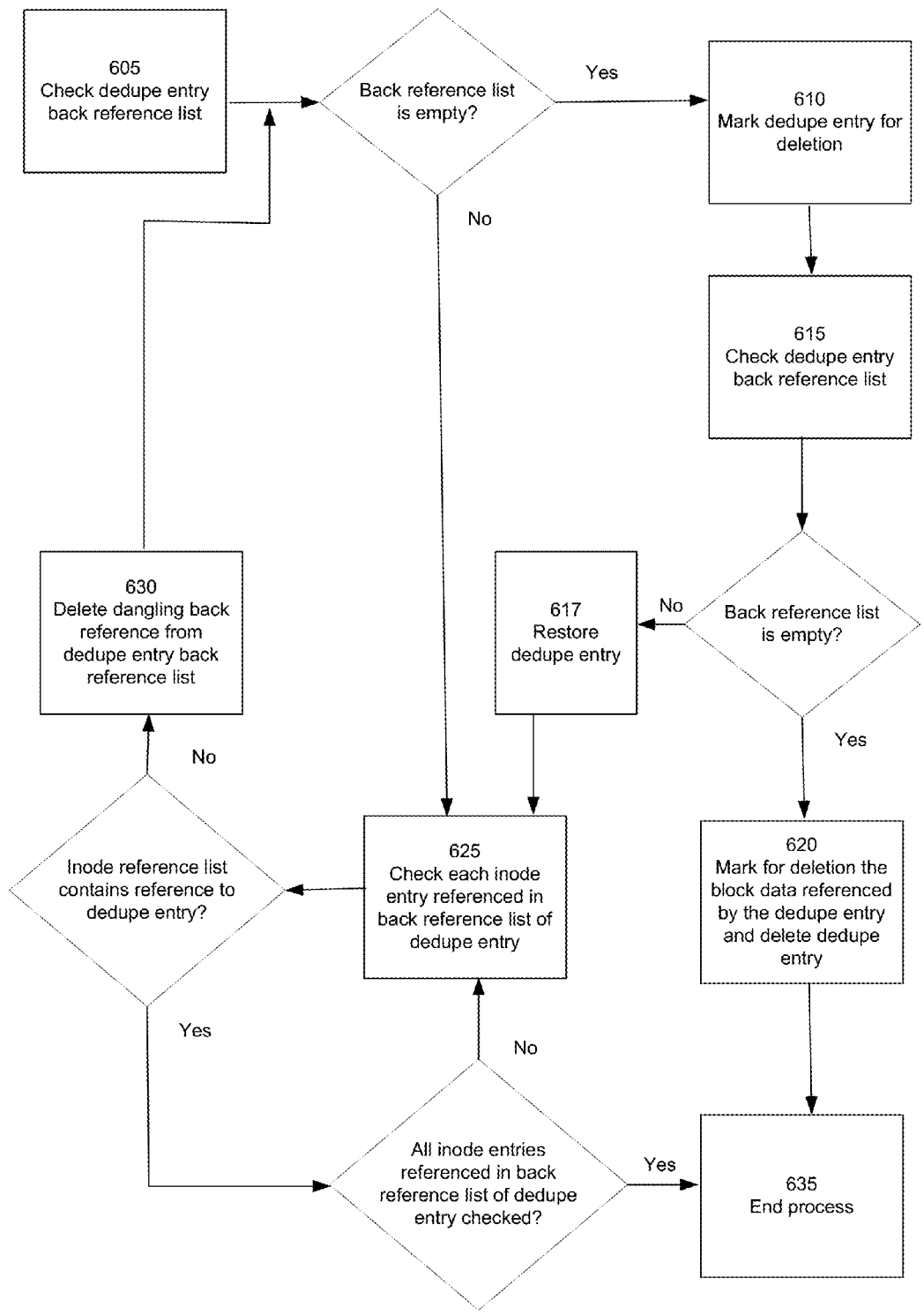
FIGS. 6A and 6B illustrate example embodiments of a process for consistency checking dedupe entries and inode entries, respectively, in a dedupe module.

FIG. 6A illustrates one embodiment of a process for checking the consistency of a dedupe entry 416 and for deleting the entry if it is an orphan (i.e., has no referrers). As a first step the customer backup 300 checks 605 if the examined dedupe entry's back reference list 403 is empty. If the back reference list 403 is not empty, the module checks 625 each inode entry 417 referenced in the back reference list 403. Checking an inode entry includes checking if the list of references 404 in the inode entry 417 contains a reference to the examined dedupe entry. If the checked inode entry does not have a reference to the examined dedupe entry, the back reference to the checked inode entry is deleted 630 from the back reference list 403. If the back reference list 403 is empty at that point, the process continues, else the next inode entry referenced in the back reference list 403 is checked 625. If all inode entries in the back reference list 403 have been checked, then the examined dedupe entry is consistent and the process is ended 635.

If the back reference list 403 is empty, then the dedupe entry is marked 610 for deletion. Note that an empty back reference list 403 indicates that the dedupe entry is currently not referenced by any inode entry, and therefore is an orphan. However, before the orphan dedupe entry is truly deleted (previously it was only marked for deletion), the back reference list 403 is again checked 615 to make sure it is empty. This is done to make sure that a reference has not been made to the orphan dedupe entry after it was marked for deletion. If the back reference list 403 is still empty the block data 418 referenced by the dedupe entry is marked for deletion and the dedupe entry is itself deleted, and the process is ended 635. In the case that a reference is made to the dedupe entry after it is marked for deletion (i.e., the back reference list is not empty) the dedupe entry is restored 617 by removing the deletion mark, and the inode entry or entries referenced in the back reference list 403 are checked 625 as described earlier.

Figure 6B:
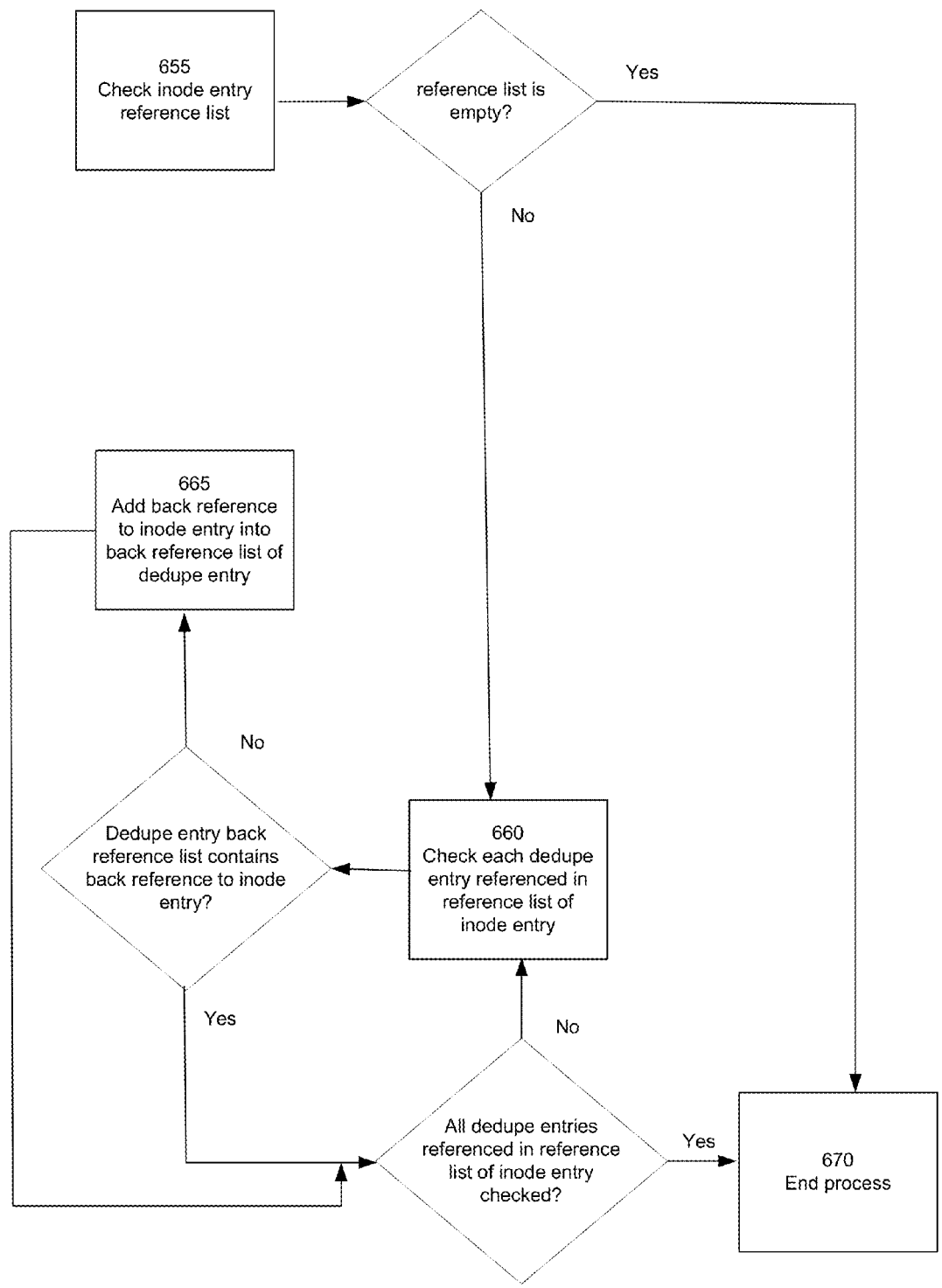

FIG. 6B illustrates one embodiment of a process for checking the consistency of an inode entry 417 and for adding back references where necessary to fix inconsistencies. As a first step the customer backup 300 checks 655 if the examined inode entry's reference list 404 is empty. If the reference list 404 is empty, the process is ended 670 as there is nothing further to do. If the reference list 404 is not empty, the module checks 660 each dedupe entry 416 referenced in the reference list 404. Checking a dedupe entry includes checking if the list of back references 403 in the dedupe entry 416 contains a back reference to the examined inode entry. If the checked dedupe entry does not have a back reference to the examined inode entry, a back reference to the examined inode entry is added 665 to the back reference list 403 of the checked dedupe entry. If all dedupe entries in the reference list 404 have been checked, then the examined inode entry is consistent and the process is ended 670.

Object Creation

Figure 7:
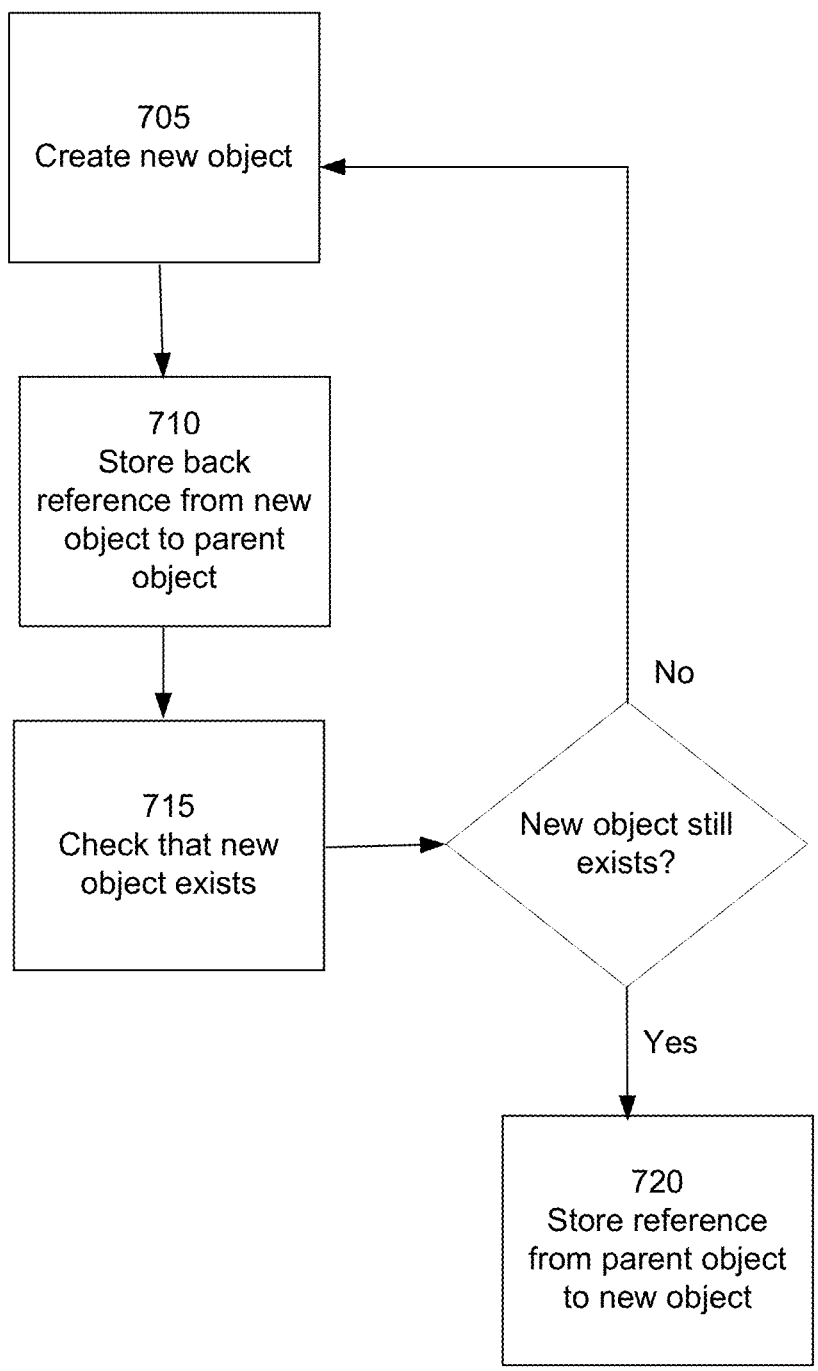
FIG. 7 illustrates one example embodiment of a generic process for creating a new object in a cloud backup service.

The process depicted in FIG. 5 and described above, illustrates a specific implementation of a more generic process for object creation in the cloud backup service 102. The more generic process, which may be used for any object, not only dedupe entries, is illustrated in FIG. 7. In this process, when a parent object requires the creation of a new (child) object, a new object is created 705, and a back reference is stored 710 from the new object to the parent object. Then the new object is checked 715 again to make sure that it still exists—to make sure it has not been garbage collected or deleted—and then only, if the new object still exists, is a reference stored 720 from the parent object to the new object.

In this way, the system insures that there are no dangling references in parent objects that refer to deleted objects. Although orphan child objects may be created by this process, they are cleaned by the garbage collection process.

Garbage Collection

In ACID compliant systems garbage collection is done by maintaining a reference counter for each data object in the system and deleting objects that have a reference count of zero. Such a system of counters, however, is not efficient in a distributed cloud backup service where hundreds of independent processes may seek to access and modify the same counters over and over again. Using counters in such a system would create unacceptable stalls and delays in processing. To overcome this, the cloud backup service 102 maintains a list of back references with each referenced data object, where the back references point to any data objects that refer to the referenced data objects. Garbage collection in the cloud backup service 102 is done by removing data objects that have empty back reference lists.

Figure 8:
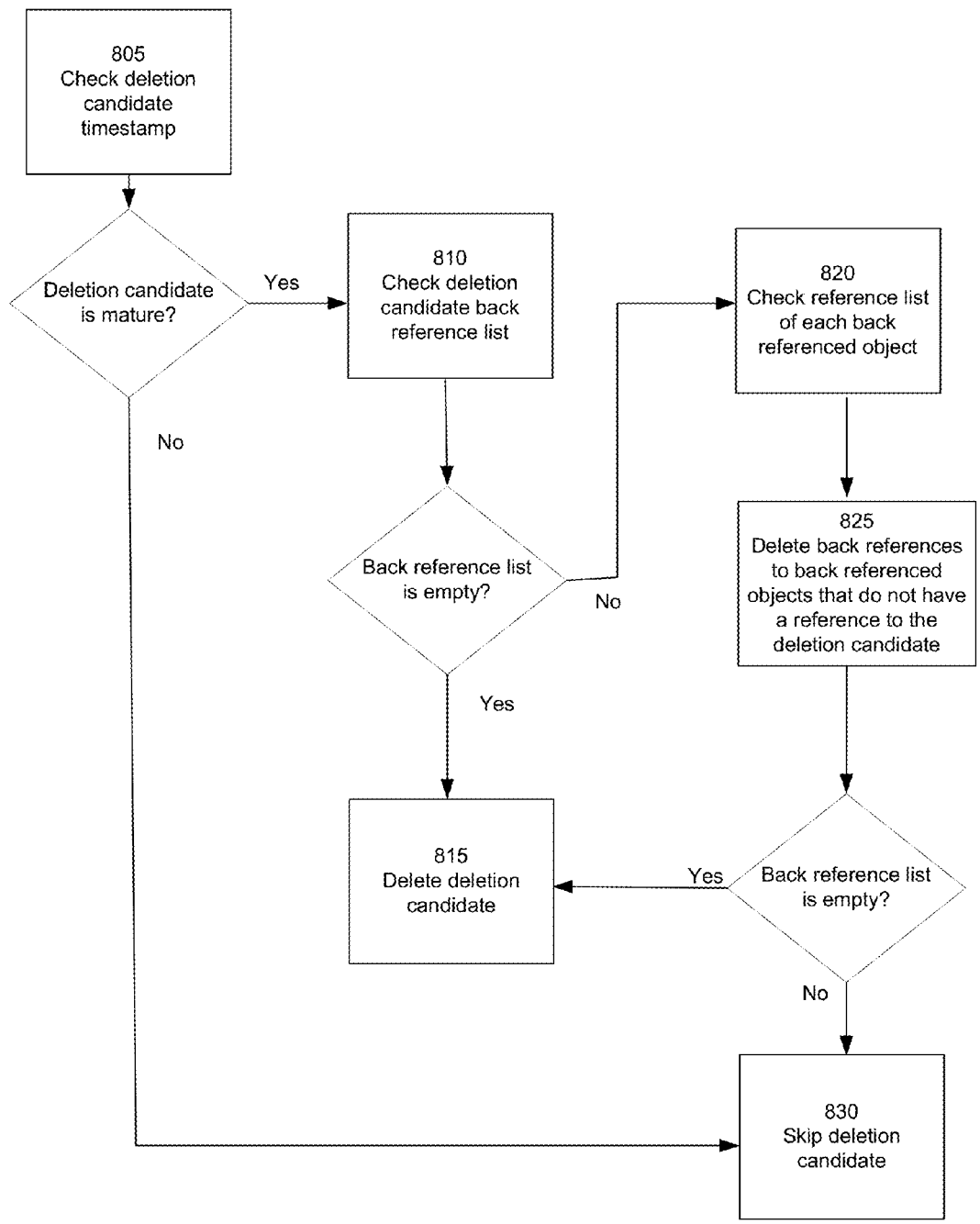
FIG. 8 illustrates one example embodiment of a generic process for deleting an object in a cloud backup service.

FIG. 8 illustrates one embodiment of a generic process used by the cloud backup service 102 to check if a data object (called the deletion candidate) may be deleted. The process illustrated in FIG. 6A and described above is a similar implementation described specifically for dedupe entries—FIG. 8 illustrates the process for any data object.

The object deletion process illustrated in FIG. 8 may be used as part of a garbage collection process for any data object in the system. In garbage collection a process walks through each data object in the system and performs the steps illustrated in FIG. 8 and described below.

The first step in the process is to check 805 the timestamp of the deletion candidate object. The timestamp of a data object indicates the time that the data object was created. Every data object in the cloud backup service 102 may have a timestamp, e.g. dedupe entries, file entries, inode entries, block data, etc. The timestamp is used to determine if the deletion candidate is old enough to delete (i.e. if the data object is "mature"). The purpose of the timestamp is to insure that new objects are not deleted while they are being initialized by the system. If the deletion candidate is not mature, then the deletion candidate is skipped 830. Maturity is determined by the amount of time that has elapsed since the data object was created. For example, a system may determine that all data objects older than an hour are mature. The amount of time that must elapse before a data object is considered mature may be fixed by the system administrators based on the amount of data stored in a customer backup 300, the capabilities of the cloud backup service 102, or some other metric.

If the deletion candidate is mature, then the back reference list of the deletion candidate is checked 810. If the back reference list is empty, then the deletion candidate is deleted 815. Deletion may occur immediately, or the deletion candidate may merely by marked for deletion, and the back reference checked again to insure it is still empty before actual deletion is done. The purpose of the second check of the back reference list is to make sure that a new reference to the deletion candidate has not been made after the garbage collection process has already begun to process the deletion candidate.

If the back reference list is not empty, the reference list of each back referenced object is checked 820. Any objects referred to in the back reference list, which do not have a reference to the deletion candidate, have their references deleted 825 from the back reference list. After this process of deleting the dangling references from the back reference list of the deletion candidate, if the back reference list is empty, the deletion candidate is deleted 815. If the back reference list still contains references (i.e. objects in the back reference list still refer to the deletion candidate), then the deletion candidate is skipped 830 (i.e. not deleted).

Shared Resource Access through Sub-Resources

The cloud backup service 102 is distributed and accessed by many user clients 100 operating simultaneously. In such a system it is not practical to lock common resources for the use of a single user client or process. However, the requirement for common resources is an unavoidable necessity. For example, a company may wish to maintain a "storage used" counter for all the user clients 100 used by its employees. This counter will need to be updated whenever a user client 100 uploads new data to the cloud backup service 102, but since multiple user clients may be uploading multiple files at any time, this resource counter may become a bottleneck if it is a single point of contention between various processes trying to update it simultaneously.

To solve this problem the system creates a number of sub-resources for each resource. Processes are allowed to lock and update sub-resources, and the sub-resource data is used in turn to update the resource. For example, for the "storage used" counter described above, there may be tens or hundreds of sub-resource counters. When a user client uploads new data to the cloud backup service 102 the service may need to update the "storage used" counter, but instead it will update one of the sub-resource counters with a record of the amount of data uploaded. After the sub-resource counter has been updated, the quantity in the sub-resource counter can be added to the "storage used" counter to maintain an updated tally of storage used.

Figure 9:
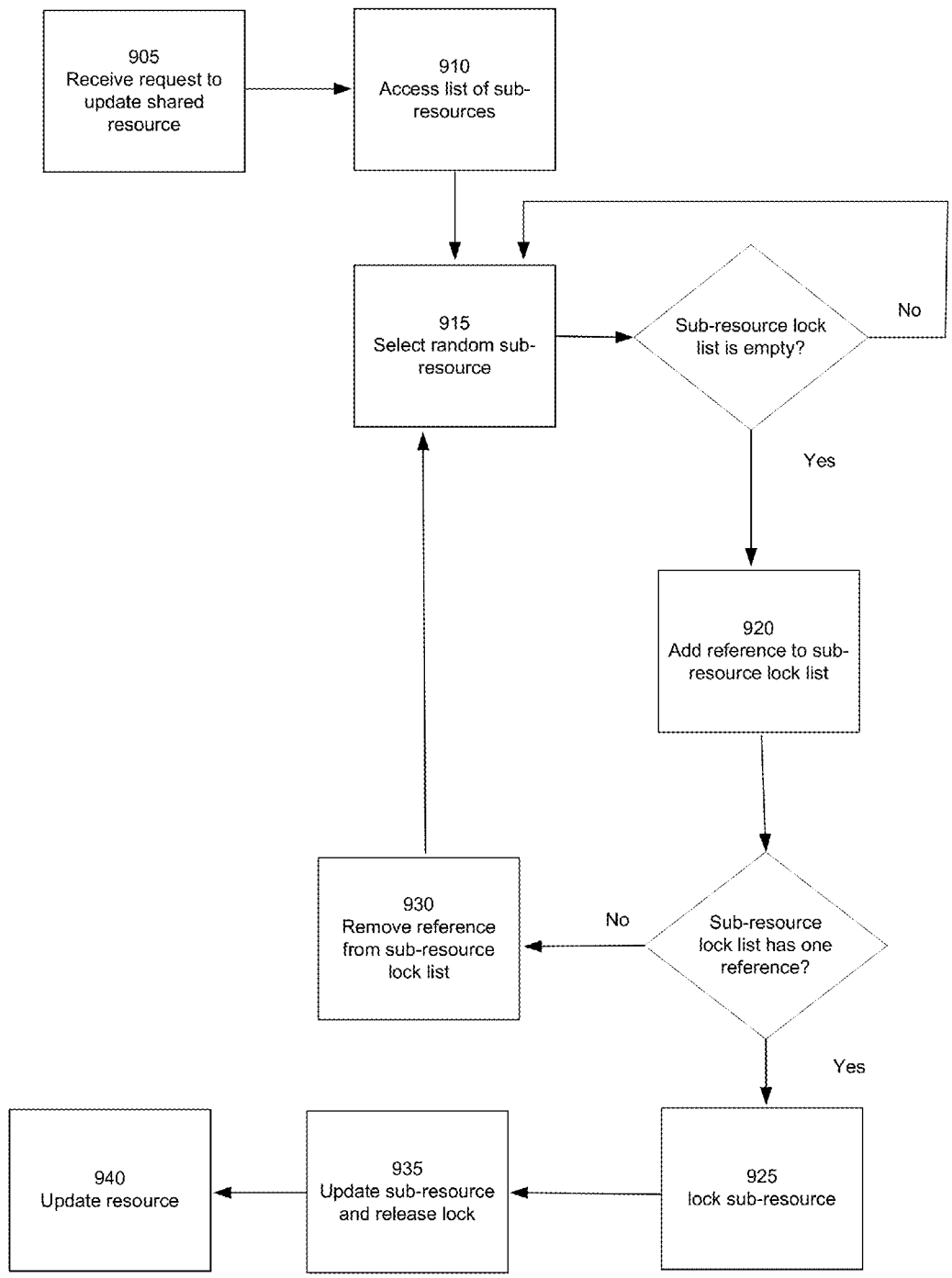
FIG. 9 illustrates one example embodiment of a process for managing sub-resources in a cloud backup service.

FIG. 9 illustrates one embodiment of a process for managing sub-resources to avoid conflict between user clients. In a first step the system receives 905 a requests to access to a shared resource. The system accesses 910 a list of sub-resources associated with that resource. A random sub-resource is selected 915 by the system and a lock list for that sub-resource is checked. The lock list for a sub-resource is a list of processes that are attempting to lock that sub-resource. If the sub-resource lock list is not empty, the system selects 915 another sub-resource. If the sub-resource lock list is empty, then the system adds 920 a reference to the sub-resource lock list and then checks to see if the sub-resource lock list has only a single entry. This check is made because another process may have found the same sub-resource and may have raced with the current process to add a reference to the sub-resource lock list. If there is more than one reference in the sub-resource lock list then the system removes 930 the reference from the sub-resource lock list and attempts to select 915 another random sub-resource.

If there is only a single reference in the sub-resource lock list, then the system locks 925 that sub-resource for the use of the process, the process updates 935 that sub-resource and releases the lock afterwards. That sub-resource can then be used to update 940 the resource.

Configuration Overview

One embodiment of a disclosed system, method and computer readable storage medium for a distributed, deduplicated, cloud-based data backup system includes a computer-implemented method comprising the steps of receiving at a server, a request from a client to store data, creating an inode entry comprising metadata associated with the data, searching a dedupe database for a dedupe entry that has a checksum equal to a checksum received in the request from the client, and responsive to finding the dedupe entry with the same checksum as in the client request, storing a reference to that dedupe entry in the inode entry. Additionally, a back reference to the inode entry is stored in the dedupe entry. Finally the inode entry is stored in an inode database.

Another embodiment comprises a computer for data storage where the computer comprises a non-transitory computer-readable storage medium storing executable computer instructions for receiving a request from a client to store data, creating an inode entry comprising metadata associated with the data, searching a dedupe database for a dedupe entry that has a checksum equal to a checksum received in the request from the client, and responsive to finding the dedupe entry with the same checksum as in the client request, storing a reference to that dedupe entry in the inode entry. Additionally, the computer includes instructions for storing a back reference to the inode entry in the dedupe entry, and storing the inode entry in an inode database.

Additional Concerns

The above description describes in several places the creation of references to data objects, such as the reference to the dedupe entries 416 stored in the list 404 in the inode entries 417, or the reference 405 to the block data entries 418 contained in the dedupe entry 416. In practice these references can be created by associating a unique identifier with the referenced data object and storing this identifier in the referrer. For example, the list of references to dedupe entries 404 in the inode entry 417 may be a list of dedupe entry identifiers.

Similarly, the reference to the block data entry 405 in the dedupe entry 416 may be a block data entry identifier.

Some portions of the above description describe the embodiments in terms of algorithmic processes or operations, for example, as set forth with respect to FIGS. 5-9. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

Figure 10:
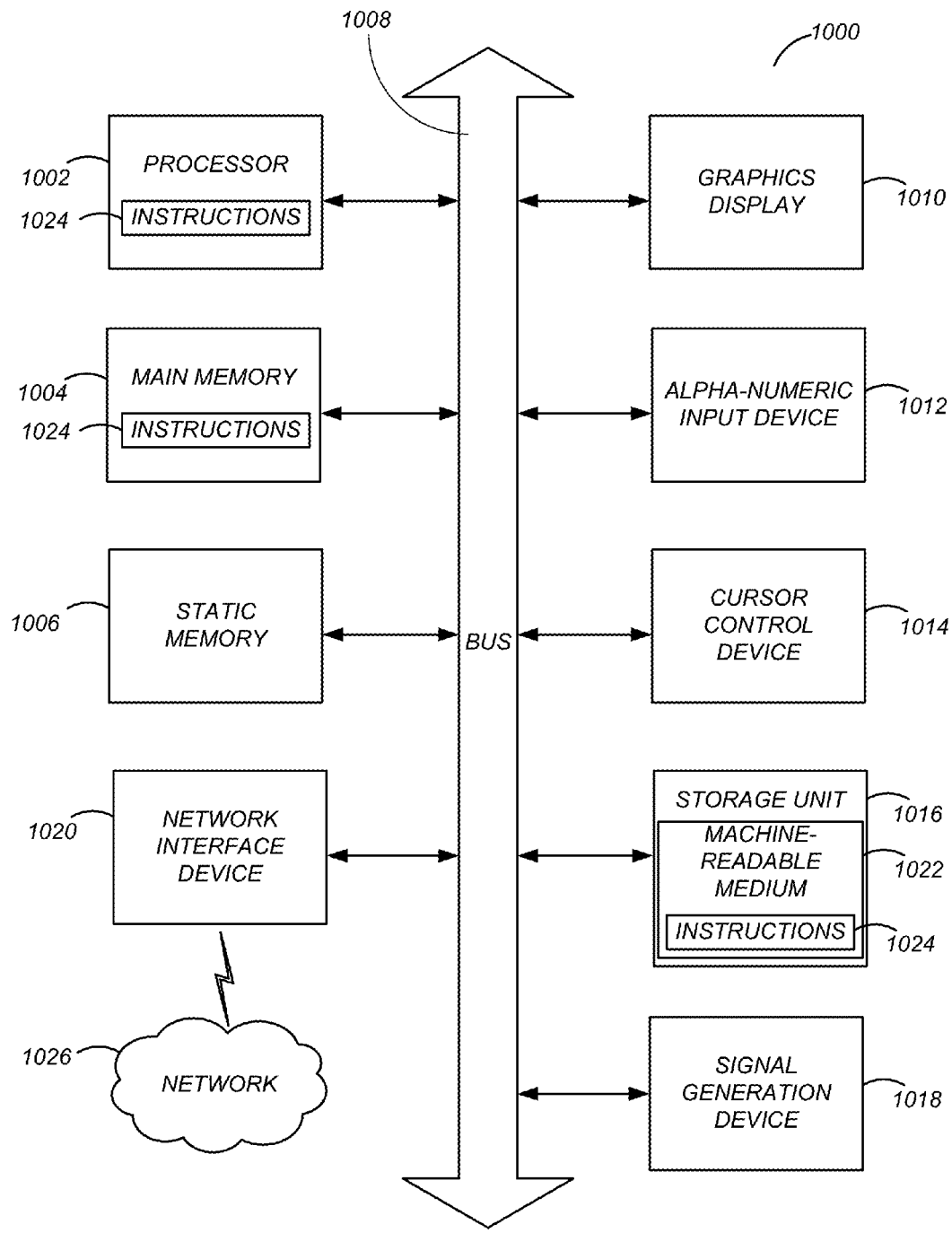
FIG. 10 illustrates one embodiment of components of an example machine able to read instructions from a machine-readable medium and execute them in a processor (or controller).

FIG. 10 is a block diagram illustrating components of an example machine for execution of processes described in FIGS. 5-9 and the modules described in FIGS. 3 and 4. This machine is an example illustrative of the client machines in the client groups 310, or the cloud backup service 102. Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 102 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying known establishments in images. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method comprising:
receiving at a server, a request from a client device to store data, the request comprising a request checksum computed from the data;
creating an inode entry comprising metadata associated with the data;
accessing a dedupe database, the dedupe database having a plurality of dedupe entries and each dedupe entry comprising a stored checksum;
searching the dedupe database for a matching dedupe entry with a stored checksum equal to the request checksum;
responsive to finding the matching dedupe entry, storing in the matching dedupe entry a back reference to the inode entry, and storing in the inode entry a reference to the matching dedupe entry that further comprises:
searching the dedupe database again for the matching dedupe entry; and
responsive to the matching dedupe entry no longer existing:
receiving the data at the server;
storing the data in a block data store;
creating a new dedupe entry;
storing the request checksum in the new dedupe entry;
storing a reference to the location of the stored data in the new dedupe entry;
storing the new dedupe entry in the dedupe database;
storing a back reference to the inode entry in the new dedupe entry; and
storing in the inode entry a reference to the new dedupe entry; and
storing the inode entry in an inode database.

2. The method of claim 1, further comprising, responsive to finding no dedupe entry with a stored checksum equal to the request checksum:
receiving at the server, the data;
storing the data in a block data store;
creating a new dedupe entry;
storing the request checksum in the new dedupe entry;
storing a reference to the location of the stored data in the new dedupe entry;
storing the new dedupe entry in the dedupe database;
storing a back reference to the inode entry in the new dedupe entry; and
storing in the inode entry a reference to the new dedupe entry.

3. The method of claim 2, wherein receiving at the server, the data, further comprises:
receiving a request to update a resource counter;
responsive to the request, selecting a random sub-resource counter;
determining that the sub-resource counter lock list is empty;
responsive to determining that the sub-resource counter lock list is empty, adding a reference to the sub-resource counter lock list;
determining that the sub-resource counter lock list has at most one reference in it;
responsive to determining that the sub-resource counter has at most one reference in it, locking the sub-resource counter, updating the sub-resource counter, and releasing the lock on the sub-resource counter.

4. The method of claim 3, further comprising:
updating the resource counter using the information in the sub-resource counter.

5. A computer-implemented method comprising:
accessing a data object in a dedupe database referencing a corresponding block data in a block data store, the data object comprising a back reference list to inode entries in an inode database, the back reference list comprising a list of references to back referenced objects, each back referenced object comprising a reference list, the reference list comprising a list of references to objects in the dedupe database;
determining if the back reference list is empty; and
responsive to the back reference list being empty, deleting the data object in the dedupe database.

6. The method of claim 5 further comprising, responsive to the back reference list being non-empty:
accessing a back referenced object;
searching the reference list of the back referenced object for a reference to the data object; and
responsive to no reference to the data object being found in the back referenced object's reference list, deleting the reference to the back referenced object in the data object's back reference list.

7. The method of claim 6, wherein the data object further comprises a time stamp.

8. The method of claim 7, further comprising, determining if the data object is mature enough to delete based on the time stamp.

9. A computer-implemented method comprising:
accessing a data object in an inode database referenced by a corresponding file entry in a backup directory database, the data object comprising a reference list to dedupe entries in a dedupe database, the reference list comprising a list of references to referenced objects, each referenced object comprising a back reference list, the back reference list comprising a list of references to back referenced objects in the inode database;
accessing a referenced object in the dedupe database;
searching the back reference list of the referenced object for a reference to the data object in the inode database; and
responsive to no reference to the data object being found in the referenced object's back reference list, adding a reference to the data object to the referenced object's back reference list.

10. A computer for data storage, the computer comprising:
a non-transitory computer-readable storage medium storing executable computer program instructions for:
receiving a request from a client device to store data, the request comprising a request checksum computed from the data;
creating an inode entry comprising metadata associated with the data;
accessing a dedupe database, the dedupe database having a plurality of dedupe entries and each dedupe entry comprising a stored checksum;
searching the dedupe database for a matching dedupe entry with a stored checksum equal to the request checksum;
responsive to finding the matching dedupe entry, storing in the matching dedupe entry a back reference to the inode entry, and storing in the inode entry a reference to the matching dedupe entry that further comprises:
searching the dedupe database again for the matching dedupe entry; and responsive to the matching dedupe entry no longer existing:
receiving the data;
storing the data in a block data store;
creating a new dedupe entry;
storing the request checksum in the new dedupe entry;
storing a reference to the location of the stored data in the new dedupe entry;
storing the new dedupe entry in the dedupe database;
storing a back reference to the inode entry in the new dedupe entry; and
storing in the inode entry a reference to the new dedupe entry; and
storing the inode entry in an inode database; and
a processor for executing the computer program instructions.

11. The computer of claim 10, further comprising instructions for, responsive to finding no dedupe entry with a stored checksum equal to the request checksum:
receiving the data;
storing the data in a block data store;
creating a new dedupe entry;
storing the request checksum in the new dedupe entry;
storing a reference to the location of the stored data in the new dedupe entry;
storing the new dedupe entry in the dedupe database;
storing a back reference to the inode entry in the new dedupe entry; and
storing in the inode entry a reference to the new dedupe entry.

12. The computer of claim 11, wherein the instructions for receiving the data, further comprise instructions for:
receiving a request to update a resource counter;
responsive to the request, selecting a random sub-resource counter;
determining that the sub-resource counter lock list is empty;
responsive to determining that the sub-resource counter lock list is empty, adding a reference to the sub-resource counter lock list;
determining that the sub-resource counter lock list has at most one reference in it;
responsive to determining that the sub-resource counter has at most one reference in it, locking the sub-resource counter, updating the sub-resource counter, and releasing the lock on the sub-resource counter.

13. The computer of claim 12, further comprising instructions for:
updating the resource counter using the information in the sub-resource counter.

14. A computer for data storage, the computer comprising:
a non-transitory computer-readable storage medium storing executable computer program instructions for:
accessing a data object in a dedupe database referencing a corresponding block data in a block data store, the data object comprising a back reference list to inode entries in an inode database, the back reference list comprising a list of references to back referenced objects, each back referenced object comprising a reference list, the reference list comprising a list of references to objects in the dedupe database;
determining if the back reference list is empty; and
responsive to the back reference list being empty, deleting the data object in the dedupe database; and
a processor for executing the computer program instructions.

15. The computer of claim 14 further comprising instructions for, responsive to the back reference list being non-empty:
accessing a back referenced object;
searching the reference list of the back referenced object for a reference to the data object; and
responsive to no reference to the data object being found in the back referenced object's reference list, deleting the reference to the back referenced object in the data object's back reference list.

16. The computer of claim 15, wherein the data object further comprises a time stamp.

17. The computer of claim 16, further comprising instructions for, determining if the data object is mature enough to delete based on the time stamp.

18. A computer for data storage, the computer comprising:
A non-transitory computer-readable storage medium storing executable computer program instructions for:
accessing a data object in an inode database reference by a corresponding file entry in a backup directory database, the data object comprising a reference list to dedupe entries in a dedupe database, the reference list comprising a list of references to referenced objects, each referenced object comprising a back reference list, the back reference list comprising a list of references to back referenced objects in the inode database;
accessing a referenced object in the dedupe database;
searching the back reference list of the referenced object for a reference to the data object in the inode database; and
responsive to no reference to the data object being found in the referenced object's back reference list, adding a reference to the data object to the referenced object's back reference list; and
a processor for executing the computer program instructions.

* * * * *